United States Patent [19]

Mayo

[11] 3,736,060
[45] May 29, 1973

[54] OPTICAL CONTOUR SCANNER

[75] Inventor: Marvin J. Mayo, Van Nuys, Calif.

[73] Assignee: Altair Scientifics, Inc., Van Nuys, Calif.

[22] Filed: Feb. 11, 1971

[21] Appl. No.: 114,419

[52] U.S. Cl...............................................356/124
[51] Int. Cl.................................................G01b 9/00
[58] Field of Search......................356/124, 125, 129

[56] References Cited

UNITED STATES PATENTS 3,468,610  9/1969  Muffoletto..........................356/129

*Primary Examiner*—Ronald L. Wibert
*Assistant Examiner*—Conrad Clark
*Attorney*—Marvin E. Jacobs

[57] ABSTRACT

A knife-edge type optical testing instrument including a pinhole source and a knife-edge device superimposed into space by means of a beam splitter. A pinhole source is conducted to the beam splitter from a remote source by means of a light conductor tube so that the bulk of the source is not disposed in the beam. The knife-edge shadow pattern is viewed remote from the operational region of the pinhole and knife-edge by means of a fiber bundle image conductor which transmits the pattern from the operational region of the knife-edge to the viewing apparatus. A triple slide mounting means maintains the pinhole source and knife-edge device in fixed relation but permits translation of the source and device accurately in three orthogonal degrees of freedom relative to a fixed reference. A triple slide base may be manually operable by means of micrometer screws having dial readouts for locating the knife-edge position. The viewing apparatus may include a microscope to provide pinhole demagnification to provide sharper shadows.

7 Claims, 7 Drawing Figures

INVENTOR.
MARVIN J. MAYO
BY
Lindenberg, Freilich & Wasserman

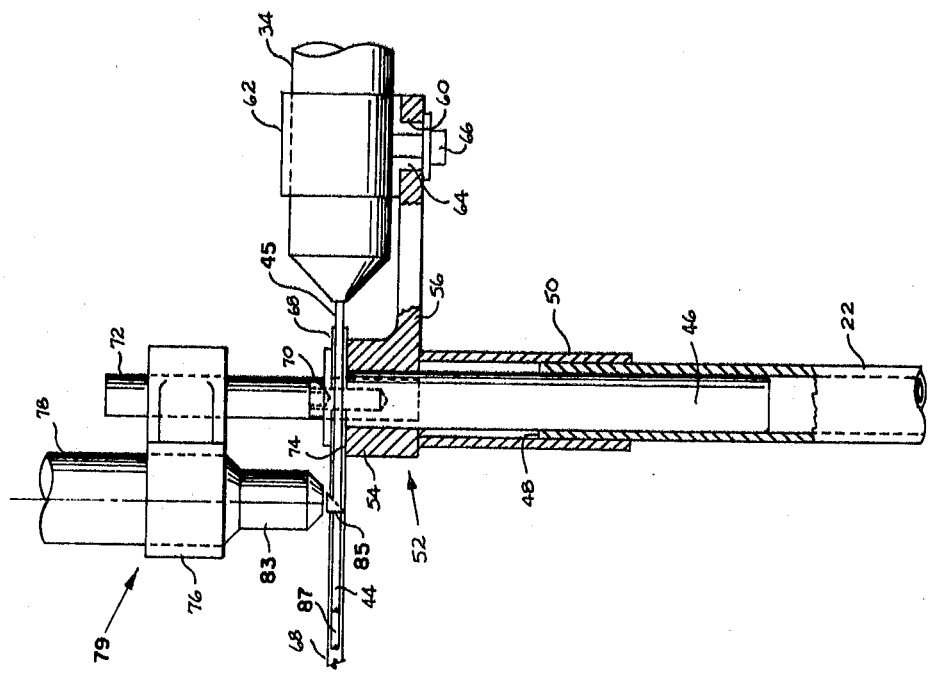
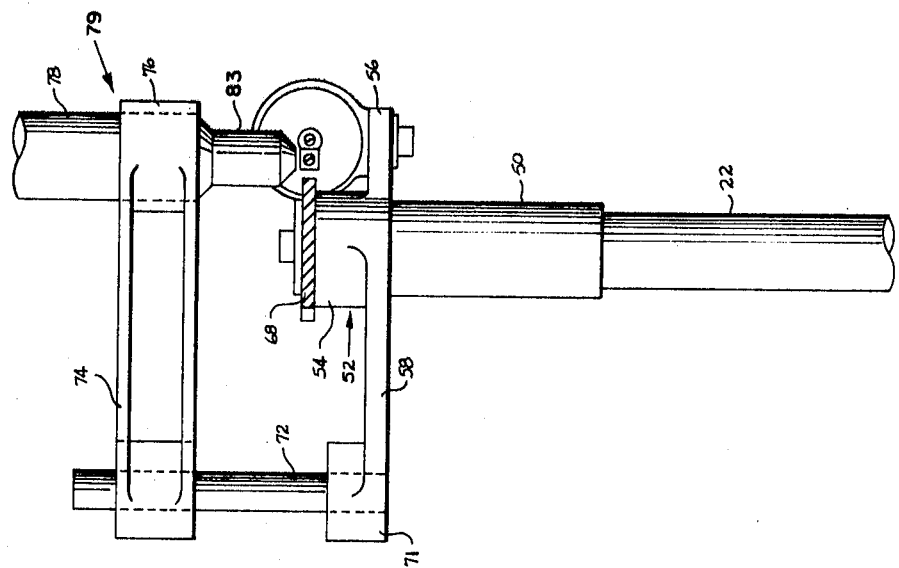

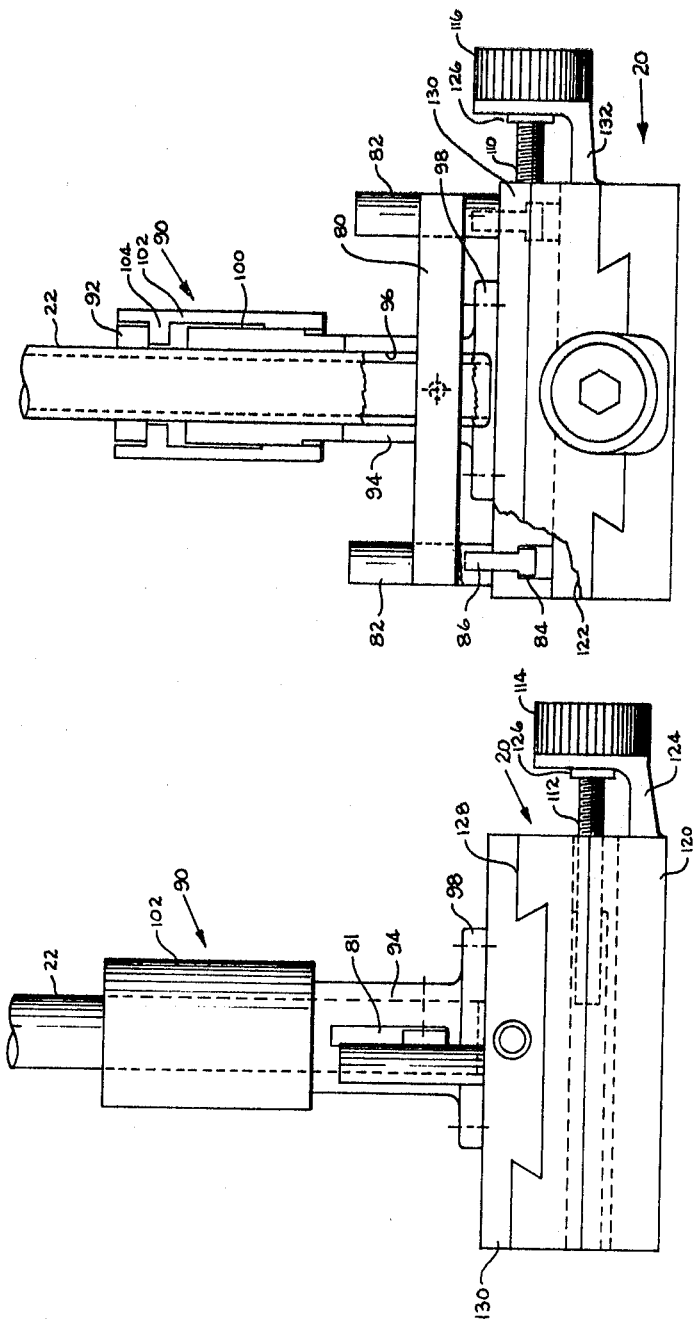

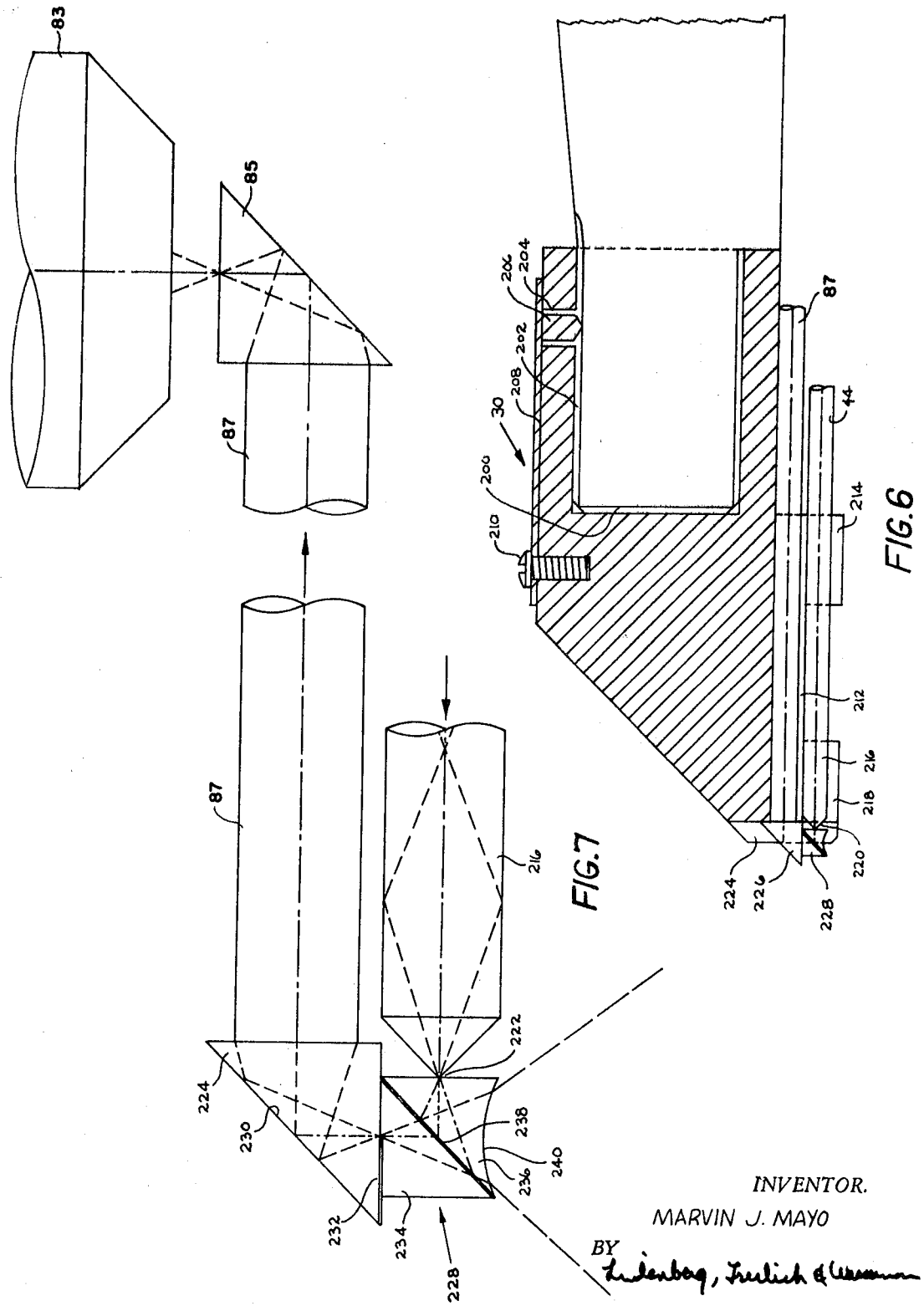

OPTICAL CONTOUR SCANNER

BACKGROUND OF THE INVENTION

1. Field of the Invention

The present invention relates to a knife-edge optical testing device, and, more particularly, to a low contour profile device providing the smallest possible blocking when the device is inserted into a beam.

2. Description of the Prior Art

Despite the sophisticated state of Twentieth Century technology, the accurate figuring of optical surfaces remains in the category of an art rather than a science. The technique requires accurate quantitative measurement of the surface being processed and a technique for reducing the surface to a precisely defined contour.

Measurement is conventionally based on the well known Foucault knife-edge test. Conventionally, a sharp edged opaque object (knife-edge) is moved across the convergence point (image point) of a bundle of rays of light, while the bundle is observed with the eye from a point close enough so that all of the rays of the bundle can enter the pupil of the eye. The effect is that of looking into it through the image point. A uniform bright field representing the aperture of the bundle is observable when there is no obstruction of the rays.

If the image is a perfect point, that is, of zero dimension, all the rays will be simultaneously and suddenly blanked out as the knife-edge is moved across that point. In an aberrated image, however, all rays do not coincide at a point and the knife-edge will selectively and progressively blank out rays according to their geometrical position relative to a nominal axis of the image field. The eye will observe this phenomenon as a progression of shadows across the aperture field, each ray being apparently projected back to the aperture of the bundle along its own path. The shadows may be interpreted in a variety of ways to yield information about the character of the optical system which produced the ray bundle, such as surface contours of the optical components, aberrations in the image, location of focus and nodal points, system alignment, etc.

Knife-edge test set-ups are usually improvized and tailored to a particular optical system or device to obtain particular type of information. The set-up for making knife-edge observations must be carefully constructed and must provide accurate control of the alignment and measurement of the knife-edge position. The rays traversing the optical system must be precisely referenced in some way to the system configuration and the source must be of sufficient brightness and uniformity to avoid false shadows.

In reflective optical systems, an image is often formed within the source beam which is incident on the collecting aperture. The image cannot be effectively probed with a knife-edge since the observer's eye cannot be brought close to the edge without blocking the source beam.

In autoreflection type of measurements instead of introducing a preformed and controlled source bundle of light into the system for a device under test it is of great advantage to start with a source which is essentially a point. Only one dimension of the diameter of the source needs to be known and it is relatively easy to make this source emit light fairly uniformly in all directions. To be usable such a source must be located at a point in space coincident with an image point of the optical system. A retroflector is positioned at the aperture end of the optical system. The retroflector has a surface matched to the wave front of the beam which is formed there as a result of placing a pinhole source at the image position. Usually, this can be a flat reflector as when a parabola is under test. The rays then emerge from the pinhole, traverse the system under test, and are reflected back on themselves to form an image superimposed on the pinhole source. An image so formed, however, cannot be probed with a physical knife-edge since the surrounding space is already occupied by the pinhole source generating devices.

SUMMARY OF THE INVENTION

The knife edge type optical testing device according to the invention can be easily set up and operated by persons of ordinary skill and with a minimum of instruction. THe device is operated in an efficient manner to provide very reliable data as to the location and shape of aberrations in the optical system or lens under test. The device is contoured so that minimum frontal area is inserted into the optical system under test and the smallest possible blocking occurs when it is inserted into a beam. The device includes means for accurate control of the alignment and measurement of the knife edge position such that the rays traversing the optical system are precisely referenced to the system configuration. The illumination source is of sufficient brightness and uniformity to avoid false shadows. The knife edge testing device of the present invention is a universal instrument wherein all internal functions are optimized to produce a significant increase in the utility and facility of knife edge testing techniques.

In the device of the present invention, the shadow image is formed remote from the collecting aperture and out of the path of the source beam. This is accomplished by use of a fiber bundle to transmit the image from the position normally occupied by the eye to a second position which extends outside the region of the source beam to a viewing apparatus, where it may be observed in detail. The slight blocking of the source beam by the fiber optical tube is not significant.

In the measurement of optical systems by the technique of auto-reflection, the problem of blocking of the reflected image superimposed on the pinhole source by the source generating device is overcome by use of a beam splitter having a surface for reflecting the light bundle from the pinhole source to the system under test and having a transparent portion receiving the returning bundle of light from the system under the test, and converging the beam to a point at the knife edge. The pinhole source provided remote to the operating portion containing the beam splitter by means of an optical fiber tube. The technique of auto-reflection, (superimposition of source and image), has two distinct advantages. System alignment is greatly simplified, since a mis-aligned system will not reflect each ray back on itself and the knife edge shadows representing aberrations will show a double displacement which is more easily and accurately read on the knife edge positioning and translating support. The translating and positioning support includes means for maintaining the pinhole source and knife edge device in fixed relationship and means for translating the knife edge relative to a fixed reference within 3° of freedom; said transmitting means being preferably manually operable by means of a set of micrometer screws provided on three coordinate axis and having dial read-outs for determining the position of the knife edge at any instant of test.

These and many other attendant advantages of the invention will become apparent as the description proceeds.

The topical test device in accordance with the invention, includes in combination, a pinhole illumination source, a knife edge, means for superimposing the pinhole source on said knife edge, a viewing apparatus and image conductor means for transferring the image from said knife edge to said viewing apparatus. The knife edge device of the invention further preferably includes housing means for the illumination source remote from the operational point of the light system under test, and means for transferring the light output from the source to the operational point by means of light transmitting fiber optics. The pinhole source and knife edge device are preferably attached to a support in a fixed relation. The support is mounted on a translatable member which can be accurately translated in three coordinate axis relative to fixed references, preferably a set of three manually operable, micrometer screws.

The invention will now become better understood by reference to the following detailed description when considered in conjunction with the accompanying drawings.

BRIEF DESCRIPTION OF THE DRAWINGS

FIG. 2 is a side elevational view partly in section of the head and upper post portion of the scanner;

FIG. 3 is a front elevational view partly in section of the head and upper post portion of the scanner;

FIG. 4 is a side elevational view of the base and lower post portion of the scanner;

FIG. 5 is a front elevational view partially broken away of the base and lower post portion of the scanner;

FIG. 6 is an enlarged sectional view of the end portion of the head; and

FIG. 7 is an optical schematic view of the scanner of the invention.

BRIEF DESCRIPTION OF THE PREFERRED EMBODIMENTS

Figure 1:
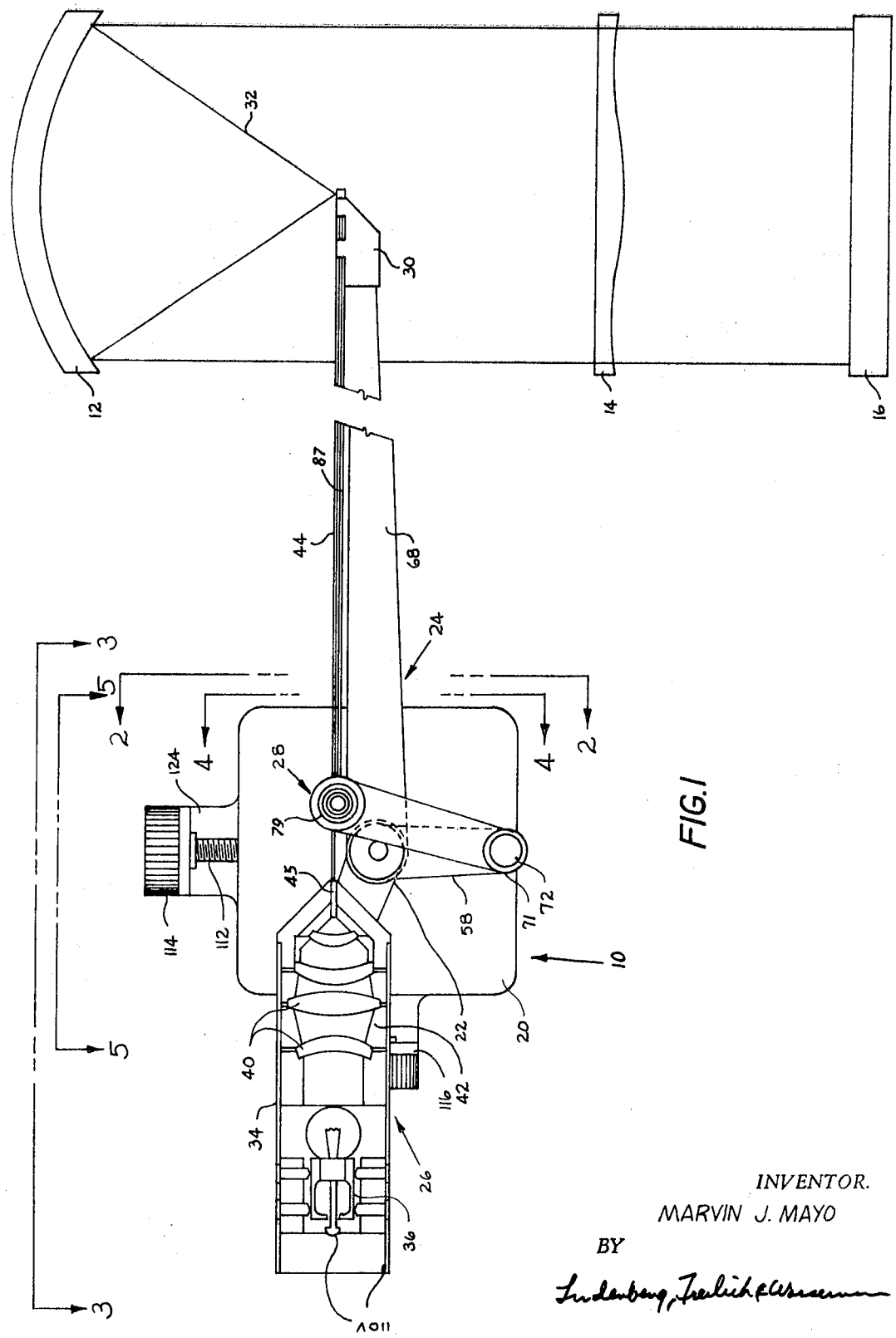
FIG. 1 is a top elevational view of the optical contour scanner of the invention partially broken-away to illustrate the lamp housing and shown with the head inserted into an optical system.

Referring now to FIG. 1, the optical contour scanner 10 of the invention is illustrated with the operational head 30 inserted into a Schmidt System. The Schmidt optical system is a two-piece combination of a spherical refractor lens 12 and an aspheric corrector lens 14 for spheric aberration. An autoreflector element 16 must be utilized in such a set-up to return the rays out of the pinhole.

The optical scanner 10 generally includes a base 20, a mounting post 22 extending from the base 20 and an upper section 24 mounted on the post 22 including a high brightness illumination source 26 and viewing apparatus 28 fixedly mounted with respect to but, remote from the operational head 30 so that they do not significantly block the beam 32.

The illumination source 26 includes a housing 34 containing a socket 36 for receiving a lamp 38 and a condensing lens system 40. The lenses 40 are held in place by means of wedge elements 42. The condensing lens system is designed to produce a minimum of spherical aberration. The output of the source 26 is delivered to the remote operational head 30 by means of a light conductor tube 44 having its rearward end 45 received in an aperture in the front end of the housing 34. The lamp must be accurately centered so that the image of the filament 11 is projected onto the end of the light conductor tube 44. The light conductor tube 44 is suitably a one-eighth inch diameter glass or clear plastic rod having a highly polished surface to maintain a substantial degree of internal reflection. If higher brightness is required for testing large optical systems, the illumination source 26 can incorporate a continuous laser. In the case of a laser source, the collimated beam can be spread with a diverging lens to an appropriate size for the pinhole source such as an $f/1$ aperture bundle of rays.

Referring further to FIGS. 2 and 3, a vertically adjustable post 46 is received within the upper end 48 of the main mounting post 22. The post 46 is secured in vertical adjustment by means of a clamp sleeve 50 which is threadably received over the upper end of the main mounting post 22. A mounting bracket 52 is received over the top end of the vertically adjustable post 46. The bracket 52 has a central sleeve portion 54 to which is attached a horizontal lamp support arm 56 and a horizontal viewing apparatus support arm 58. The bracket is secured at its upper end by means of the head and optical tube support beam 68. The upper end of the vertically adjustable post 46 contains a threaded recess. An Allen head bolt 70 is received through an aperture near the rear end of the beam 68 and is threaded into the recess in the post 46 and engages the top end 74 of the bracket 52. The arms 56 and 58 extend from the central sleeve portion 54 of the bracket at different positions, suitably 90° apart such that the microscope assembly 28 is removed and does not interfere with the lamp housing 34. A circular bore 60 is formed in lamp support arm 56 near the end thereof. A circular clamp 62 surrounds the lamp housing 34. The clamp 62 has an integral cylindrical nut member 64 attached to the bottom thereof. The member 64 is received within the bore 60 and is secured by a bolt 66.

The viewing apparatus support arm 58 terminates in a boss 71 having a vertical bore for receiving a support rod 72. An upper support arm 74 is rotatably received on the upper portion of rod 72. A clamp bracket 76 receives the barrel 78 of a microscope 79. The objective lens 83 of the microscope 79 is rotatable into position over the prism 85. The prism 85 is disposed at the end of an image conductor tube 87. The tube 87 is positioned below the light conductor tube 44 and is secured to the beam 68. Other viewing apparatus such as a diffusing screen can be utilized to view an enlarged image of the knife-edge shadow pattern transmitted by the image conductor tube to an area remote from the optical system.

Referring additionally now to FIGS. 4 and 5, the lower portion of the mounting post 22 is mounted on the base 20. The post 22 is not rigidly fixed to the base 20, but can slide vertically, being held against rotation by a long key 80. The key 80 rides in an elongated vertical slot 81 in mounting post 22 and the micrometer guide member 94. The key 80 is attached at its ends to eccentrically adjustable guide posts 82. The guide posts 82 are secured to the base 20 by means of bolts 84 having a head received in a recess in the base 20 and a threaded stem 86 extending into threaded bores in the lower portion of the posts 82.

Vertical adjustment of the main mounting post 22 is provided by means of the vertical micrometer 90. The vertical micrometer 90 acts on a collar 92 secured to the post 22. The vertical micrometer includes an internal guide member 94 having an internal bore 96 receiving the mounting post 22. The lower end of the guide member 92 terminates in an enlarged flange 98, which rests on the upper surface of the base 20. The outer surface of the upper end of the guide member 94 is threaded at 100. A micrometer nut 102 having internal threads is received on the threads 100 of the guide member 94, and extends over the collar 92. The micrometer nut 102 has an internally depending annular flange 104 which supports the collar 92 and mounting posts 22. Micrometer graduations are imprinted or etched onto the outside surfaces of the collar 92 and micrometer nut 102.

The base 20 is a dual cross-slide of conventional design fitted with micrometer screws 110, 112 and dials 114, 116 for position adjustment and control of the mounting post 22 in two degrees of freedom in the horizontal plane. The bottom plate 120 of the base 20 is stationary and has an upper keyed surface receiving the interfitting bottom surface of the lower slide 122. A first L-shaped bracket 124 extends from the bottom plate 120 for supporting and guiding the micrometer screw 112. The screw 112 extends through an aperture in the vertical portion of the bracket 124 into the dial knob 114, and is secured thereto by means of a nut 126. The other end of screw 112 is attached to the lower slide 122.

The lower slide 122 has an upper keyed surface 128 orthogonal to the lower surface for receiving the slotted lower surface of the upper slide 130. A second L-shaped bracket 132 is connected to the lower slide 122 in a direction parallel to the key on the upper slide 130, for supporting the micrometer screw 110 and dial knob 116 in the manner previously described. The combination of the vertical micrometer 90 and dual cross-slide base permits translation of the operational portions of the device in 30° of freedom relative to a fixed reference. The translation devices are manually operable and provides 3 dial readouts. It is realized that many other types of translation supports may be utilized and may be located at other positions such as adjacent the upper portion of the post. The position control and adjustment may be automated to provide electronic recording or display of the position of the operating head of the device.

The dual cross-slide should provide at least two inches of travel in each direction. The vertical micrometer may also have up to 2 inches or more of travel and the upper vertically adjustable post 46 can be clamped to the main mounting post 22 in any rotational position and over a a-inch range of heights.

Referring further now to FIG. 6, the head 30 is removable from the outer end 200 of the support beam 68. The head 30 has a slot 202 receiving the end 200 of the beam. An aperture 204 extends into the slot 202 for receiving a spring loaded detent 206. The spring 208 is attached to the top of the head 30 by means of a bolt 210.

A first tubular support element 212 is attached to the bottom of the head 30 and receives the end portion of the image conductor tube 86. An inner tubular clamp 214 is attached to the head directly below element 212 for supporting the end of the illumination light conductor rod 44. A pinhole element 216 is positioned at the end of rod 44 by means of a tubular clamp 218. The pinhole element 216 has a cylindrical rod portion terminating in a tapering conical head 220 which is opaque to light except at the apex 222 thereof to form a pinhole aperture. A condensing lens system incorporating either a positive or negative lens may be disposed between the aperture and the beam splitter 228 to provide further pinhole demagnification, suitably down to 0.0002 inches so that sharper shadow images may be observed.

A bracket 224 extends from the front lower tip of the head 30 for mounting a reflector prism 226 in front of the fiber optic image tube 86 and a beam splitter cube 228 in front of the pinhole aperture element 216. The image tube, light conductor tube and operating head are of very narrow profile and are small in area relative to a beam of light in which they are transversely positioned, such that the slight blocking of the source beam by these elements can easily be ignored. For example, the device of the invention can be constructed utilizing a one-eighth inch diameter glass or clear plastic rod for the light conductor tube and a one-eighth inch diameter optical fiber bundle for the image conductor tube and a head having a total thickness of one-fourth inch. With these dimensions, the head of device, can be inserted into a beam three or more inches in diameter, without significant obstruction or blocking of the beam. Not more than 10 percent of the beam will be blocked. The dimensions can readily be scaled down to permit transverse insertion into a beam one inch in diameter with no more than 10 percent blocking of the beam.

Referring further now to FIG. 7, the reflector prism 224 has a highly reflective end surface 230. The forward portion 232 of the bottom surface of the prism 224 is opaque forming the knife-edge for the device. The beam splitter cube 228 is formed of a pair prisms 234, 236 so arranged, that the internal mating surface 238 of the prism reflects one half the illumination light from the pinhole source 222 which approaches the surface 238 and transmits the remainder, which is then lost through the open face of the cube. Of the returning bundle approaching the surface 238, one half will be transmitted to the knife edge and the remainder is reflected and passes out through the inner face of the cube. The outgoing surface 240 of the beam splitter 223 may be provided with a curved refracting surface to correct and compensate for spherical aberration produced by the beam splitter cube. Of course, half of the light energy is lost at the beam splitter at each pass, outgoing and returning.

The knife-edge device of the invention can be economically utilized to obtain precise and reliable quantitative data for producing accurate and universal optical surfaces without dependence on operator skill or judgment. The head of the device is inserted into the optical system with the outgoing surface 228 of the beam splitter in the proximity of the image point of the optical system under test and with the support beam 68 transverse to the illumination beam.

The illumination source is energized and light conducted by the light conductor tube 44 is constructed by the pinhole element 216 to a pinhole source emanating from the apex 222. The pinhole light source is reflected off the diagonal surface 238 and is directed to the optical system under test. The returning bundle then passes through the beam splitter surface, 238 and converges to a point at the knife-edge 232. The shadow pattern is reflected by the prism 224 into the fiber optical image tube 87 and by prism 85 into the objective lens 83 of the microscope 79. The knife-edge is moved across the shadow by means of the micrometer screws and the dial readouts provide precise quantitative information concerning lens aberrations. A more detailed technique suitable for producing an optical contour map of a lens system is described in more detail in my copending application entitled "Method and Apparatus for Controlled Lapping of Optical Surfaces to Correct Deviations from Desired Contours," Ser. No. 114,114 filed concurrently herewith and this disclosure is incorporated herein by reference.

It is to be understood that only preferred embodiments of the invention have been described and that numerous substitutions, alternations and modifications are all permissible without departing from the spirit and scope of the invention as defined in the following claims.

What is claimed is:

1. An optical testing apparatus for testing and evaluating an optical system comprising:
   a. frame means including a generally elongated portion;
   b. an operating head disposed at one end of said elongated portion for projecting a light source into the optical system under test and evaluation and collecting said light after it has traversed the optical system, said operating head sized to be inserted into the optical system at an image point thereof so as to block only a substantially minimal portion of said light traversing the optical system;
   c. illumination source means disposed on said frame means at a generally predetermined location substantially remote from said operating head, and light conduction means operatively connecting said source means to said operating head for conducting illumination from said source to said operating head;
   d. a viewing apparatus disposed on said frame means at a generally predetermined location substantially remote from said operating head and means for transferring the light collected from the optical system by the operating head to said viewing apparatus, said transferring means operatively connecting said viewing apparatus and operating head;
   e. said operating head including pinhole means disposed in the path of the light projected from the operating head into the optical system whereby said light projected into the optical system is substantially a point source, and knife edge means disposed in the path of the light collected by said operating head after it has traversed the optical system in an adjustably predetermined position at which the collected light is converged to a point whereby said viewing apparatus will have conducted to it by said transferring means the image of the point source of light projected into the optical system being reflected back on itself in a superimposition on said knife edge means; and
   f. means for converging and superimposing the point source of light projected into the optical system and the light collected after transversing the optical system on said knife edge means.

2. The apparatus as set forth in claim 1 wherein said convergence and superimposition means comprises an optical beam splitter prism disposed in said operating head between said pinhole means and knife edge means.

3. The apparatus as set forth in claim 2 further including means for compensating for spherical aberration produced by said beam splitting prism comprising a curved refracting surface on the side of said prism that the light projected into the optical system exits from.

4. The apparatus as set forth in claim 1 wherein said transferring means comprises a fiber-optic bundle for transferring the image formed on said knife edge means to said viewing apparatus.

5. The apparatus as set forth in claim 1 wherein said light conduction means comprises an elongated light conductor tube having a high degree of internal reflection with a first end disposed adjacent said illumination source means and a second end disposed proximate said pinhole means.

6. The apparatus as set forth in claim 1 wherein said frame means include translating means for accurately translating said operating head in three coordinate axes relative to said frame means.

7. The apparatus as set forth in claim 6 wherein said translating means comprises a telescoping, vertically disposed mounting post including a micrometer screw adjustment and a base member receiving said post, said base member being selectively moveable by micrometer screw adjustment with respect to said frame means, in at least two degrees of freedom in the horizontal plane.

* * * * *